(12) United States Patent
Okami et al.

(10) Patent No.: US 7,239,464 B2
(45) Date of Patent: Jul. 3, 2007

(54) ABSORPTION TYPE MULTI-LAYER FILM ND FILTER

(75) Inventors: Hideharu Okami, Chiba (JP); Yoshiyuki Abe, Chiba (JP); Tokuyuki Nakayama, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 11/179,994

(22) Filed: Jul. 13, 2005

(65) Prior Publication Data

US 2006/0018050 A1 Jan. 26, 2006

(30) Foreign Application Priority Data

Jul. 20, 2004 (JP) ............................. 2004-211250
Jun. 7, 2005 (JP) ............................. 2005-167534

(51) Int. Cl.
*G02B 5/22* (2006.01)
(52) U.S. Cl. ................. 359/888; 359/885; 359/585
(58) Field of Classification Search ............... 359/885, 359/888, 585
See application file for complete search history.

(56) References Cited

U.S. PATENT DOCUMENTS 3,679,291 A * 7/1972 Apfel et al. ............... 359/587
3,781,089 A * 12/1973 Fay et al. .................. 359/587
4,960,310 A * 10/1990 Cushing .................... 359/888
6,587,288 B2 * 7/2003 Erz et al. ................... 359/885
6,671,109 B2 * 12/2003 Kunii ......................... 359/888
6,842,301 B2 * 1/2005 Nakajima et al. .......... 359/888
2006/0068226 A1 * 3/2006 Kunii ......................... 428/702

FOREIGN PATENT DOCUMENTS

| JP | 55-47361 | 11/1980 |
| JP | 57-195207 | 11/1982 |
| JP | 7-63915 | 3/1995 |
| JP | 2000-96167 | 4/2000 |
| JP | 2002-350610 | 12/2002 |

* cited by examiner

*Primary Examiner*—Leonidas Boutsikaris
(74) *Attorney, Agent, or Firm*—Armstrong, Kratz, Quintos, Hanson & Brooks, LLP (57) ABSTRACT

An absorption type multi-layer film ND filter having a substrate and an optical multi-layer member consisting essentially of metal layers each composed chiefly of nickel (Ni) and dielectric layers each formed of any one of $SiO_2$, $Al_2O_3$ and a mixture of these; the layers being alternately layered on the substrate. An Ni type metallic material having a small wavelength dependence of transmittance in the visible spectral range is used in the metal layers serving as light attenuation layers, and this enables materialization of an ND filter which can attain transmittance attenuation that is flat for wavelengths.

11 Claims, 8 Drawing Sheets

ABSORPTION TYPE MULTI-LAYER FILM ND FILTER

BACKGROUND OF THE INVENTION

1. Field of the Invention

This invention relates to an absorption type multi-layer film ND filter (neutral density filter) having a substrate and an optical multi-layer member consisting of metal layers and dielectric layers which are alternately layered on the substrate. More particularly, it relates to an improvement of an absorption type multi-layer film ND filter, so improved as to be able to achieve flat transmittance characteristics in a better reproducibility and moreover have superior mass productivity.

2. Description of the Related Art

ND filters refer to optical filters having non-selective transmittance such that, of light rays, those belonging to all wavelengths in the visible spectral range are substantially equally transmitted, and are used in the state they are fitted to lenses of digital cameras or the like in order to attenuate the quantity of transmitted light. For example, they are commonly used in a case in which, when films are inevitably overexposed however lenses are stopped down under conditions where the quantity of light is large as in fine weather, the quantity of light is limited so that the shutter can be released at a lower speed, or in a case in which, when the diaphragm should be set full-open but films are inevitably overexposed even though the shutter is released at a maximum speed, the quantity of light is limited so that the diaphragm can be set full-open.

Now, inexpensive ND filters include glass filters formed of glass to which a light absorber has been added. However, such glass filters have had problems such that their spectral characteristics are not uniform over the whole visible range.

As what can solve such a problem, the absorption type multi-layer film ND filter is known in the art. For example, Japanese Patent Application Laid-open No. S57-195207 discloses a light absorbing film in which two multi-layer films having dielectric films and metal films and having reflection preventive effect even when they are each used alone are so put together from above and below as to face each other with other dielectric film inside at the middle.

As background art making reference to the types of materials for dielectric films and metal films, Japanese Patent Publication No. S55-47361 for example also discloses an absorptive thin film formed of Ti or Cr metal films and $MgF_2$ dielectric films which are alternately layered. Still also, Japanese Patent Application Laid-open No. 2002-350610 discloses a thin-film type ND filter formed of Nb metal films and $SiO_2$ dielectric films which are alternately layered.

Japanese Patent Application Laid-open No. H7-63915 further discloses a thin-film type ND filter which has a multi-layer structure having about seven layers as the number of layers and making use of light absorptive metal oxide layers including those of titanium oxides such as TiO and $TiO_2$.

However, in the light absorbing film disclosed in Japanese Patent Application Laid-open No. S57-195207, only two layers are used as the metal films and hence there has been a problem that, depending on the type of the material to be used as a metal film, it is very difficult to make small the wavelength dependence of transmittance and also control reflectance. There has further been a problem that, since the metal film is a film which is as thin as several nanometers and is readily oxidized, the transmittance may come higher than the designed value because of thermal oxidation in the course of a manufacturing process.

In the case of the absorptive thin film or thin-film type ND filter disclosed in Japanese Patent Publication No. S55-47361 or Japanese Patent Application Laid-open No. 2002-350610, there has been a problem that the wavelength dependence of transmittance in the visible spectral range, of the metal film constituted of Ti, Cr or Nb is so great as to make it difficult to achieve the transmittance attenuation that is flat for wavelengths. There has also been a problem that the material $MgF_2$ used in the dielectric film may greatly corrode or deteriorate by water adsorption in the air.

In addition, in the thin-film type ND filter disclosed in Japanese Patent Application Laid-open No. H7-63915, the light absorptive metal oxide layers including those of titanium oxides are formed by vacuum deposition. There, however, has been a problem that, in forming metal oxide layers (TiO, $TiO_2$) as intermediate layers by vacuum deposition or sputtering, the flow rate of oxygen must delicately be controlled in either of the vacuum deposition and the sputtering, making it difficult to stabilize film quality.

SUMMARY OF THE INVENTION

The present invention has been made taking note of such problems. Accordingly, an object of the present invention is to provide an absorption type multi-layer film ND filter that can achieve flat transmittance characteristics in a good reproducibility and moreover can promise superior mass productivity.

Another object of the present invention is to provide an absorption type multi-layer film ND filter which enables stable production of filters with uniform characteristics when manufactured by magnetron sputtering.

That is, the absorption type multi-layer film ND filter according to the present invention comprises:

a substrate; and an optical multi-layer member consisting essentially of metal layers each composed chiefly of nickel (Ni) and dielectric layers each formed of any one of $SiO_2$, $Al_2O_3$ and a mixture of these; the layers being alternately layered on the substrate.

As the substrate, a resin sheet or a resin film may be used.

The metal layers each composed chiefly of nickel (Ni) may also be constituted of nickel (Ni) alone, or an Ni alloy material formed by adding to Ni at least one element selected from Ti, Al, V, W, Ta and Si.

According to the absorption type multi-layer film ND filter of the present invention, it has a structure having a substrate, and an optical multi-layer member consisting essentially of metal layers each composed chiefly of nickel (Ni) and dielectric layers each formed of any one of $SiO_2$, $Al_2O_3$ and a mixture of these, the layers being alternately layered on the substrate, and makes use of an Ni type metallic material that has a small wavelength dependence of transmittance and moreover can not easily be oxidized to have a small change in transmittance. Hence, an ND filter can be materialized which can achieve transmittance that is flat for wavelengths.

In particular, in the case when the above metal films are constituted of the Ni alloy material formed by adding to Ni at least one element selected from Ti, Al, V, W, Ta and Si, the ferromagnetic properties of an Ni target is weakened, and hence absorption type multi-layer film ND filters with uniform characteristics can stably be produced by magnetron sputtering.

An adherent layer constituted of Si, SiO$_x$ (where x is 2 or less), SiN$_x$ (where x is 1 or less), TiO, TiO$_x$ (where x is 2 or less) or TiN$_x$ (where x is 1 or less) may also be provided between the substrate and the optical multi-layer member. This enables improvement in adherence at the interface of the both to prevent the optical multi-layer member from coming off or peeling. Also, this therefore enables formation of films by dry-process roll-to-roll process coating, in particular, formation of optical multi-layer members by sputtering, and enables improvement in mass productivity.

DESCRIPTION OF THE PREFERRED EMBODIMENTS

The absorption type multi-layer film ND filter of the present invention is described below in detail with reference to the accompanying drawings.

In the first place, the absorption type multi-layer film ND filter according to the present invention is characterized by having a substrate, and an optical multi-layer member consisting essentially of metal layers each composed chiefly of nickel (Ni) and dielectric layers each formed of any one of $SiO_2$, $Al_2O_3$ and a mixture of these; the layers being alternately layered on the substrate.

Figure 1:
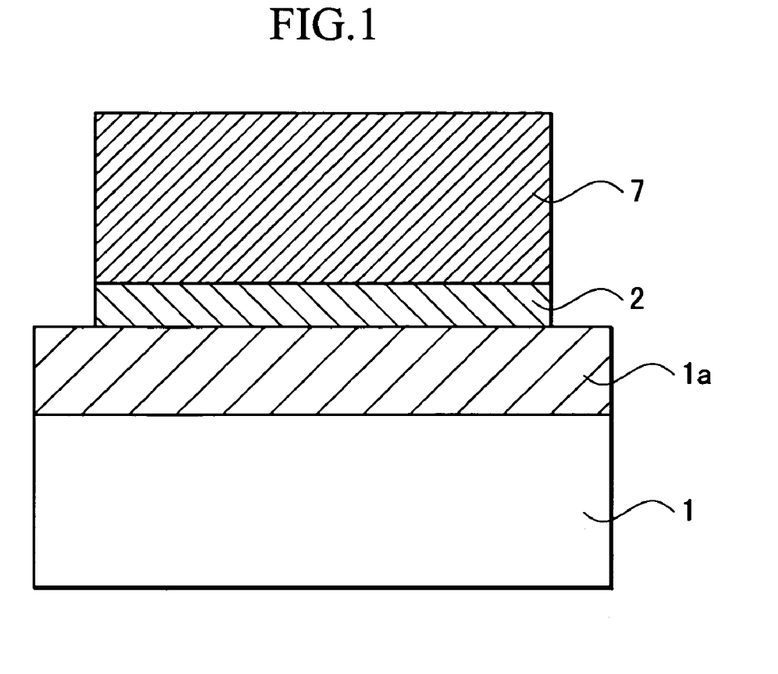
FIG. 1 illustrates the construction of an absorption type multi-layer film ND filter according to the present invention.
Figure 2:
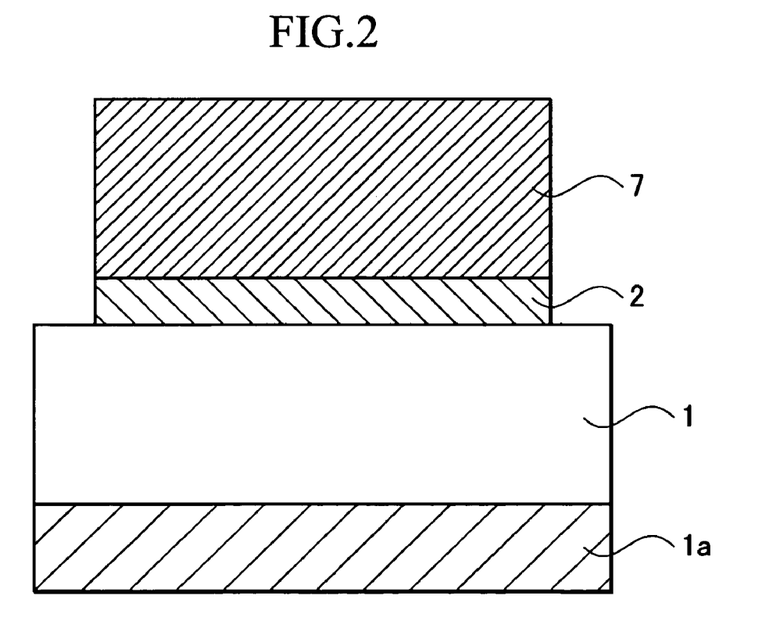
FIG. 2 illustrates the construction of another absorption type multi-layer film ND filter according to the present invention.
Figure 3:
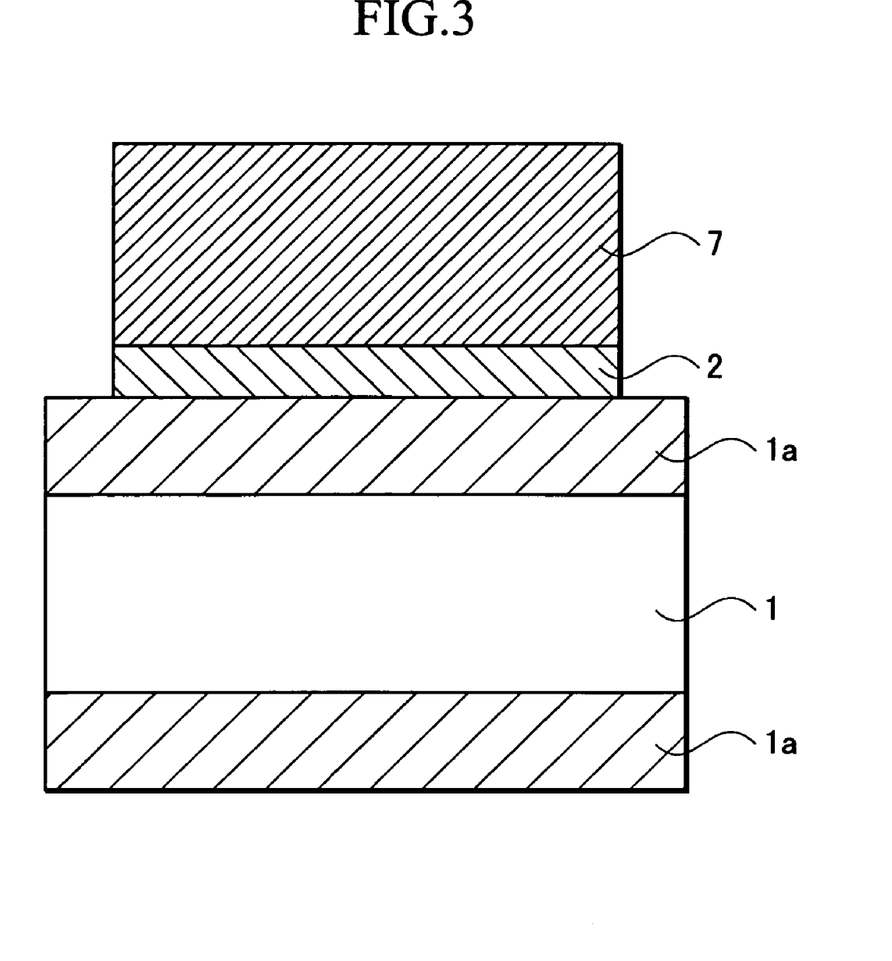
FIG. 3 illustrates the construction of still another absorption type multi-layer film ND filter according to the present invention.

Specific examples of the absorption type multi-layer film ND filter according to the present invention are shown in FIGS. 1 to 3. More specifically, in the absorption type multi-layer film ND filter, an optical multi-layer member 7 is provided on a substrate 1 via an adherent layer 2; the substrate 1 being provided with a hard coat layer 1a by coating.

The absorption type multi-layer film ND filters shown in FIGS. 1 and 2 each have a structure in which the hard coat layer 1a is provided on one side of the substrate. FIG. 1 shows a structure in which the adherent layer 2 and the optical multi-layer member 7 are provided on the side where the hard coat layer 1a is provided. FIG. 2 also shows a structure in which the adherent layer 2 and the optical multi-layer member 7 are provided on the side opposite to the side where the hard coat layer 1a is provided. Also, the absorption type multi-layer film ND filter shown in FIG. 3 has a structure in which the hard coat layer 1a is provided on each side of the substrate and the adherent layer 2 and the optical multi-layer member 7 are provided on its one side.

As the substrate, there are no particular limitations on materials therefor. Preferred are those which are transparent. Where mass productivity is taken into account, the substrate may preferably be a substrate having flexibility, which enables dry-process roll-to-roll process coating described later. The substrate having flexibility is superior to conventional glass substrates and the like in view of advantages that it is inexpensive, light-weight and rich in deformation properties. In particular, a resin sheet or a resin film is preferred as the substrate.

As specific examples of a material constituting the substrate, it may include resin sheet or resin film single materials selected from resin materials of polyethylene terephthalate (PET), polyether sulfone (PES), polyarylate (PAR), polycarbonate (PC), polyolefin (PO) and norbornene, and composite materials of i) the resin sheet or resin film single materials selected from the above resin materials and ii) acrylic organic films with which one side or both sides of any of these single materials is/are covered. In particular, as to the norbornene resin material, it may include, as typical materials, ZEONOR (trade name), available from Nippon Zeon Co., Ltd., and ARTON (trade name), available from JSR Corporation.

The hard coat layer 1a is a layer formed on the substrate by coating to improve substrate strength. For example, it is formed using an acrylic resin, which is coated on the substrate in a thickness of, e.g., 5 µm. However, the hard coat layer 1a need not necessarily be provided.

In each of the absorption type multi-layer film ND filters shown in FIGS. 1 to 3, between the substrate 1 and the optical multi-layer member 7 the adherent layer 2 is also provided, which improves adherence between the both and relaxes any stress that may be produced in the optical multi-layer member 7. The adherent layer 2 may preferably be constituted of SiO, SiO$_x$ (where x is 2 or less), SiN$_x$ (where x is 1 or less), TiO, TiO$_x$ (where x is 2 or less) or TiN$_x$ (where x is 1 or less). The adherent layer 2 may be formed in a thickness within the range of from 1 nm or more to 10 nm or less. This is because, if it has a thickness of less than 1 nm, no sufficient adherence may be achievable, and there is a possibility of causing film peeling or cracking at the interface between the both, and, if on the other hand it has a thickness of more than 10 nm, a low transmittance may result, and there is a possibility that no flat optical characteristics are obtainable in the visible spectral range. Then, where the above adherence, optical characteristics and so forth are taken into account, the adherent layer 2 may more preferably have a thickness of about 2 nm. Incidentally, the adherent layer 2 may be formed by, e.g., DC sputtering.

Next, the optical multi-layer member 7 is provided on the substrate 1, and is formed by alternately layering thereon the metal layers each composed chiefly of nickel (Ni) and the dielectric layers each formed of any one of $SiO_2$, $Al_2O_3$ and a mixture of these.

Here, the metal layers each constituted of an Ni type metallic material composed chiefly of nickel (Ni) may preferably be constituted of an Ni alloy material formed by adding to Ni at least one element selected from Ti, Al, V, W, Ta and Si.

The reason therefor will be stated in detail later, and here may be sketched out as follows: Where Ni layers and so froth are formed by sputtering, the thickness of an Ni target decreases with continuous use of the Ni target, where the leakage magnetic field in plasma space becomes stronger at the part where the Ni target has become thinner. Then, as the leakage magnetic field in plasma space becomes stronger, discharge characteristics (such as discharge voltage and discharge current) become different, so that the rate of film formation may change. That is, the reason is that the continuous use of the same Ni target for a long time brings about the problem that the rate of film formation for the Ni film changes as the Ni target is consumed, to make it difficult to stably produce absorption type multi-layer film ND filters with uniform characteristics. To avoid this problem, the above Ni alloy material formed by adding to Ni at least one element selected from Ti, Al, V, W, Ta and Si may be used to constitute the metal layer.

Figure 4:
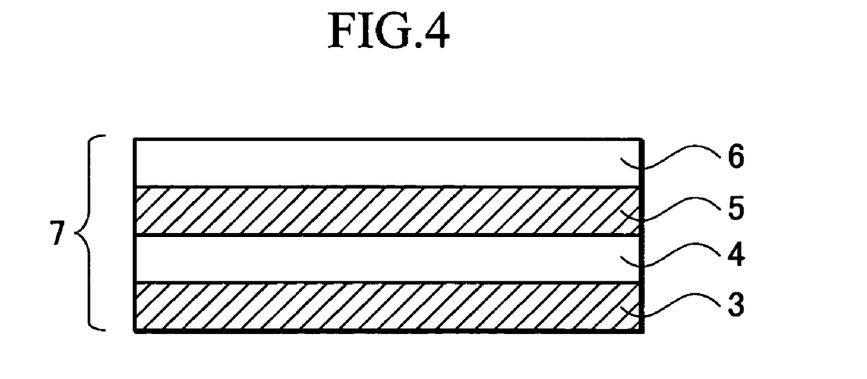
FIG. 4 illustrates the construction of the optical multi-layer member of the absorption type multi-layer film ND filter according to the present invention.

Next, FIG. 4 shows the construction of the optical multi-layer member 7. This optical multi-layer member 7 consists essentially of metal layers 3 and 5 each composed chiefly of Ni and dielectric layers 4 and 6 each formed of any one of $SiO_2$, $Al_2O_3$ and a mixture of these; the layers being alternately layered. The number of these layers may be of any number. In FIG. 4, an optical multi-layer member 7 is shown which consists of two layers each for both the metal layers 3 and 5 and the dielectric layers 4 and 6, i.e., four layers in total.

Figure 5:
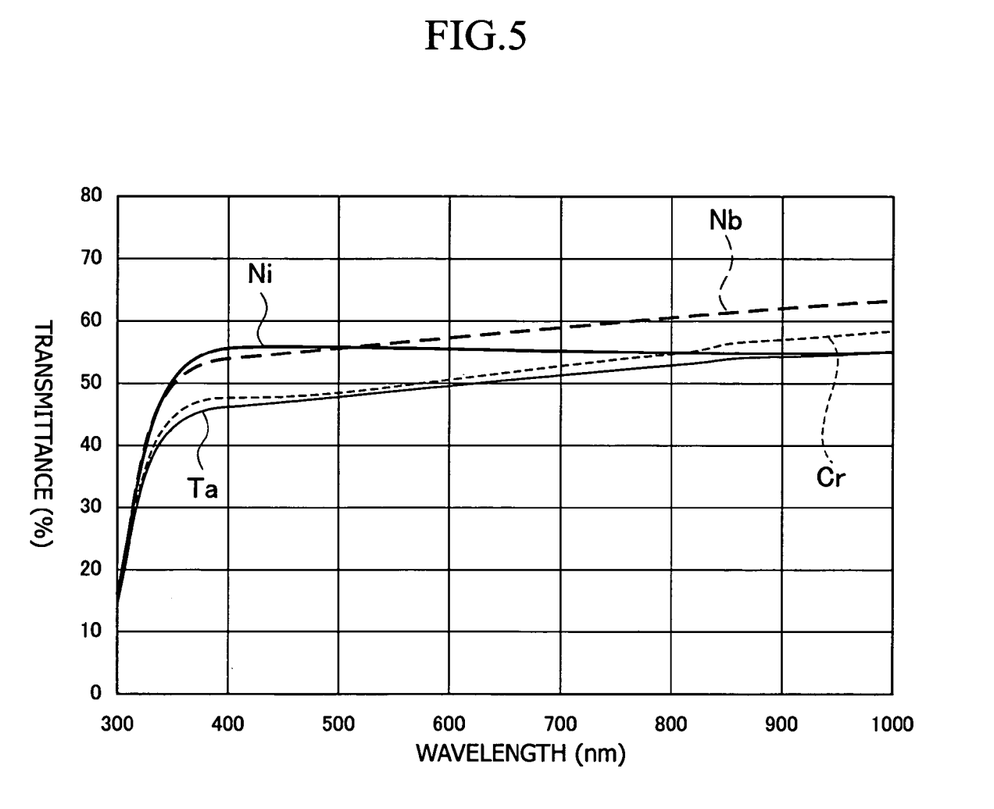
FIG. 5 is a graph showing the relationship between transmittance and wavelength in an Ni thin film, a Cr thin film, an Nb thin film and a Ta thin film.

Now, the transmittance at wavelengths of from 400 nm to 1,000 nm has experimentally been examined on an Ni film of 6.5 nm in thickness, constituted of pure Ni, to obtain the results shown in FIG. 5. Also, for comparison, in FIG. 5 shown together is the transmittance of each of a Cr thin film, a Ta thin film and an Nb thin film which have the same thickness.

As is clear from the graph in FIG. 5, it is confirmed that the wavelength dependence of transmittance in the Ni thin film is smaller than that in each of the Cr thin film, the Ta thin film and the Nb thin film. More specifically, the variation widths of transmittance in the Cr thin film, the Ta thin film and the Nb thin film at wavelengths of from 400 nm to 800 nm are 14.7%, 13.5% and 11.8%, respectively, whereas the variation width of transmittance in the Ni thin film is as low as 1.5%.

Figure 8:
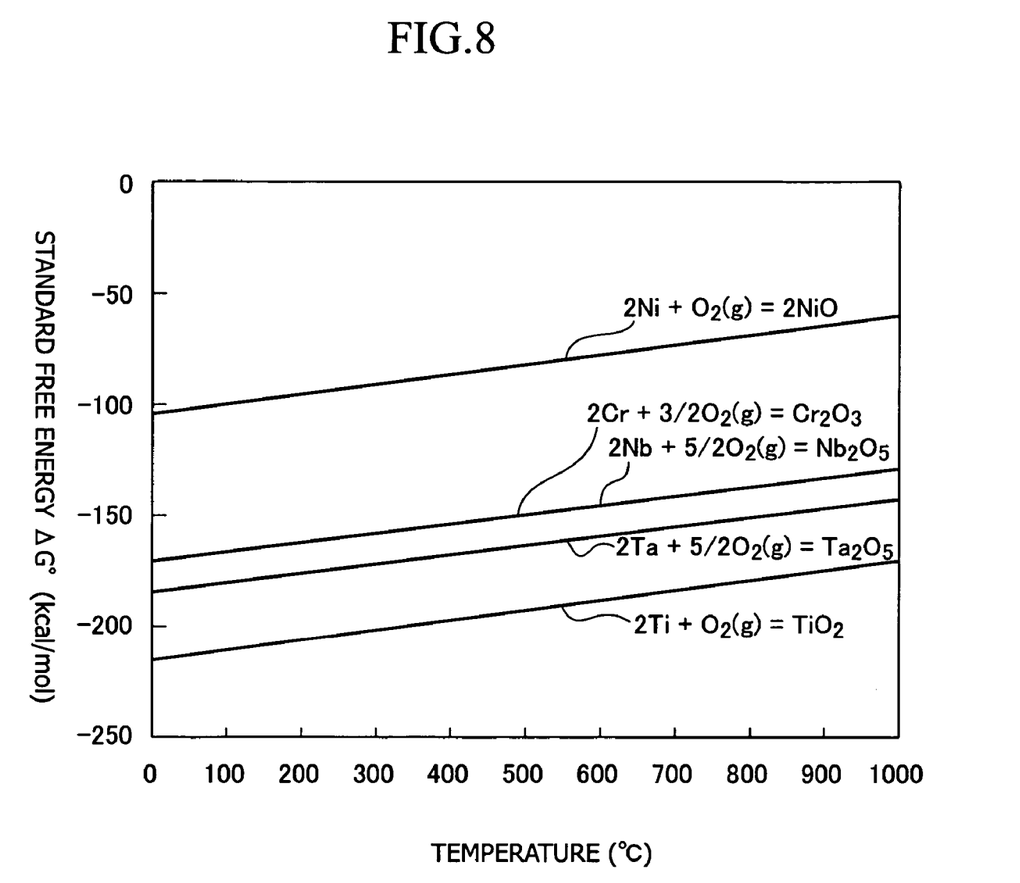
FIG. 8 is a graph showing the relationship between standard free energy and temperature in oxides of Ni, Ti, Cr, Ta and Nb.

FIG. 8 is also a graph showing the relationship between standard free energy and temperature in oxides of Ni, Ti, Cr, Ta and Nb, which is commonly called Ellingham diagram. Then, in the graph in FIG. 8, it is shown that metals are more readily oxidized as the standard free energy of an oxide is lower, i.e., as a straight line is positioned at the lower side of the graph. It is confirmed therefrom that, of the above metals, Ni is a metal that is most not readily oxidized. Accordingly, where the Ni thin film is used, it is expected that the change in transmittance is smallest which is due to oxidation caused chiefly by heat during the ND filter manufacturing process or oxidation with time in actual use.

Where the Ni, having a small wavelength dependence of transmittance in the visible spectral range, is used in a light absorbing layer (the metal layer), its wavelength dependence of transmittance in the visible spectral range is so small as to be able to achieve transmittance attenuation that is flat for wavelengths, and also its characteristics can not easily deteriorate due to oxidation during manufacture of ND filters and during use, making it possible to materialize an absorption type ND filter using a single-layer film.

However, the light reflecting from the surface of such an absorption type ND filter is stray light, which adversely affects image quality of digital cameras or the like. Hence, the absorption type ND filter is constituted of the multi-layer film so that the surface of the absorption type ND filter can also be provided with the effect of preventing such reflection.

Thus, in the absorption type multi-layer film ND filters shown in FIGS. 1 to 3, the layer thickness of each of the metal layers 3 and 5 each composed chiefly of Ni is well controlled, and moreover the Ni thin films have a small wavelength dependence of transmittance in the visible spectral range and also may cause only a small change in transmittance due to oxidation. Hence, the optical multi-layer member 7 constituted of metal layers and dielectric layers enables, without superposing layers in a large number, stable achievement of the attenuation of transmittance that is flat for visible light, without causing any deterioration with time.

Incidentally, the dielectric layers 4 and 6 are thin films each formed of a dielectric, and may preferably be constituted of a material having a refractive index which is as low as possible with respect to the metal layers 3 and 5 composed chiefly of Ni. As such a dielectric material, any one of $SiO_2$, $Al_2O_3$ and a mixture of these may be used as described above. Also, the layer thickness of the dielectric layers 4 and 5 may preferably be so controlled as to make the optical multi-layer member 7 have the effect of preventing reflection.

The thickness of each of the metal layers 3 and 5 each composed chiefly of Ni and the dielectric layers 4 and 6 each formed of any one of $SiO_2$, $Al_2O_3$ and a mixture of these is previously so set that the optical multi-layer member 7 can keep its stated transmittance and reflectance in the visible spectral range (e.g., approximately from 400 to 800 nm), and the metal layers 3 and 5 may each particularly preferably have a thickness of from 2 nm to 30 nm. In the present absorption type multi-layer film ND filter, the optical multi-layer member 7 is formed incorporating the metal layers 3 and 5 composed chiefly of Ni, and hence, even though it has as few as four layers in the number of layers, it has sufficiently flat transmittance characteristics.

Next, the optical multi-layer member may be formed by, e.g., sputtering.

The sputtering is a thin-layer forming method that is effective when films are formed on substrates by the use of materials having a low vapor pressure or when precise layer thickness control is required, and is widely used because of its very simple operability. Then, the sputtering is superior to other film forming processes in respect of adherence between the film and the substrate or a film of a different type, flatness of film surface, denseness of the film, and so forth, and hence is very advantageous in producing ND filters. In general, it is a method in which, under argon gas pressure of abut 10 Pa or less, the substrate is set as the anode, and a target serving as a film raw material is set as the cathode, where glow discharge is made to take place to generate argon plasma, and also argon cations in the plasma are made to collide against the cathode target to sputter the particles of the target component so that the particles are deposited on the substrate to form films.

The sputtering is classified by how to generate the argon plasma. What makes use of high-frequency (RF) plasma is called high-frequency sputtering, and what makes use of direct-current plasma is called direct-current sputtering. Also, a process in which a magnet is disposed on the back of the target and the argon plasma is concentrated just above the target to improve collision efficiency of argon ions even at a low gas pressure to form films is called magnetron sputtering.

Then, the metal layers composed chiefly of Nm in the optical multi-layer member according to the present invention may be formed by direct-current magnetron sputtering making use of an Nm type metal target in an atmosphere of, e.g., Ar (argon) gas. Also, the dielectric layers may be formed by high-frequency magnetron sputtering making use of an Si target in an atmosphere of, e.g., Ar gas and $O_2$ gas. Inasmuch as the dielectric layers are formed by such high-frequency magnetron sputtering, any abnormal discharge that may occur in reactive sputtering can be prevented to enable stable film formation.

Now, the pure Nm material is a ferromagnetic material. Hence, in the case when the metal layers are formed by the direct-current magnetron sputtering, the magnetic force coming from the magnet disposed on the back of the target and made to act on the plasma generated between the target and the substrate is obstructed by the Nm target material, and the magnetic field leaking to the surface may weaken to make it difficult to concentrate the plasma and form films in a good efficiency. In order to avoid this, films may preferably be formed by sputtering where a cathode (high-magnetic-field cathode) in which the magnetic field strength of the magnet disposed on the back of the target has been made stronger is used so that the magnetic field passing through the Nm target can be made stronger (over 400 Gauses).

However, even where such a method is employed, another problem as stated below may come about at the time of production. That is, the thickness of the target decreases with continuous use of the Ni target, where, as stated previously, the leakage magnetic field in plasma space becomes stronger at the part where the target has become smaller in thickness. Then, as the leakage magnetic field in plasma space becomes stronger, discharge characteristics (such as discharge voltage and discharge current) may become different, so that the rate of film formation may change. That is, the continuous use of the same Ni target for a long time brings about the problem that the rate of film formation for the Ni film changes as the Ni target is consumed, to make it difficult to stably produce absorption type multi-layer film ND filters with uniform characteristics. To avoid this problem, as described previously the Ni alloy material formed by adding to Ni at least one element selected from Ti, Al, V, W, Ta and Si may be used to constitute the metal layer.

In the present invention, it is preferable to use an Ni type material containing the Ti element in an amount ranging from 5 to 15% by weight. The reason why the lower limit of the Ti content is set to 5% by weight is that the incorporation of Ti in an amount of 5% by weight or more enables the ferromagnetic properties to be extremely weakened, so that films can be formed by the direct-current magnetron sputtering even with use of a cathode provided with a usual magnet having a low magnetic force. Also, the ability to make the magnetic field obstructed by the target is so low that the change in leakage magnetic field in plasma space that depends on the consumption of the target can also be small and a constant rate of film formation can be maintained to enable stable film formation. Also, the reason why the upper limit of the Ti content is set to 15% by weight is that, if the Ti is incorporated in an amount of more than 15% by weight, there is a possibility that an intermetallic compound is formed in a large quantity to make the material no longer have small wavelength dependence of transmittance. The amount of any of the Al element, V element, W element, Ta element and Si element to be added may also be determined by the same reasons. Where any of these Al element, V element, W element, Ta element and Si element is/are added, it is preferable to make up an Ni alloy material formed by adding to Ni the Al element in a proportion of from 3 to 8% by weight, the V element in a proportion of from 3 to 9% by weight, the W element in a proportion of from 18 to 32% by weight, the Ta element in a proportion of from 5 to 12% by weight and/or the Si element in a proportion of from 2 to 6% by weight.

However, where two or more elements are added to the Ni, the amount of each element to be added may preferably be control to be lower than each upper-limit value so that the intermetallic compound may not be formed in a large quantity. For example, where Ti and Si two types of elements are to be added to Ni, if the Si element is added in an amount of more than 5% by weight with respect to the Ti element to be added in an amount of 7.5% by weight, the intermetallic compound may seriously be formed even though each numerical value of the amounts of these to be added is within the above compositional range (Ti element: from 5 to 15% by weight; Si element: from 2 to 6% by weight).

Incidentally, in addition to the elements such as Ti, Al, V, W, Ta and Si, Cu, Cr or the like is available as an additive element which can weaken the ferromagnetic properties of Ni. However, if the Cu element is used as the additive element, it has a disadvantage that such an Ni—Cu film has an inferior adherence to the oxide film, compared with the above elements Ti, Al, V and so forth. For example, as disclosed in Japanese Patent Application Laid-open No. 2000-96167, which relates to a target material used in electrode materials, a field different from the ND filter, a target composed of an Ni—Ti alloy in place of an Ni—Cu alloy is proposed because there is a problem in the adherence to an oxide ceramic substrate. Thus, the Cu element is a material not suitable as the additive element in the present invention. Also, the Cr element has no problem on the adherence, but is not preferable because it may adversely affect the environment.

The metal layers composed chiefly of Ni and the dielectric layers formed of any one of $SiO_2$, $Al_2O_3$ and a mixture of these may also be formed on a filmlike substrate by dry-process roll-to-roll process coating.

The employment of the above constitution on the optical multi-layer member makes it possible to provide an absorption type multi-layer film ND filter having a reflectance of 5% or less in the whole visible spectral range of from 400 nm to 800 nm and also having variation of transmittance in a width within 10%.

EXAMPLES

The present invention is described below in greater detail by giving Examples.

Example 1

An absorption type multi-layer film ND filter having a structure shown in Table 1 was produced, in which an optical multi-layer member consisting of Ni metal layers each containing 7.5% by weight of Ti and $SiO_2$ layers both of which layers were alternately layered in the number of four layers in total was formed on a substrate via an adherent layer formed of $SiO_x$ (x is less than 2).

Here, as an Ni type material target, an Ni target containing 7.5% by weight of Ti was used (a target available from Sumitomo Metal Mining Co., Ltd.). This target containing 7.5% by weight of Ti was stably dischargeable also when placed on a non-magnetic-purpose cathode.

TABLE 1

| (2) | Adherent layer: | $SiO_x$ | 5 nm |
|---|---|---|---|
| (3) | Optical multi-layer member first layer: | Ni—Ti | 6 nm |
| (4) | Optical multi-layer member second layer: | $SiO_2$ | 90 nm |
| (5) | Optical multi-layer member third layer: | Ni—Ti | 9 nm |
| (6) | Optical multi-layer member fourth layer: | $SiO_2$ | 75 nm |

Stated specifically, films (2) to (6) shown in Table 1 were formed in this order, on a PET film of 5 μm in thickness with an acrylic hard coat (a film available from Toyobo Co., Ltd.) by means of a sputtering apparatus (manufactured by ULVAC Corporation) to produce the absorption type multi-layer film ND filter shown in FIG. 1.

The transmittance and reflectance of this absorption type multi-layer film ND filter were measured with an autographic spectrophotometer (U4100, an instrument manufactured by Hitachi Ltd.). The results of measurement are shown in FIGS. 6A and 6B.

Figure 6A:
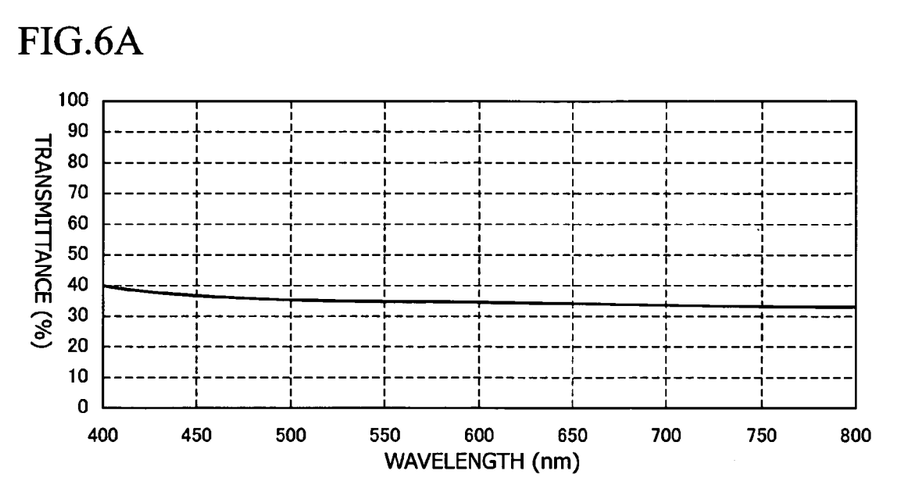
FIG. 6A is a graph showing the relationship between transmittance and wavelength of an absorption type multi-layer film ND filter according to Example 1 of the present invention.
Figure 6B:
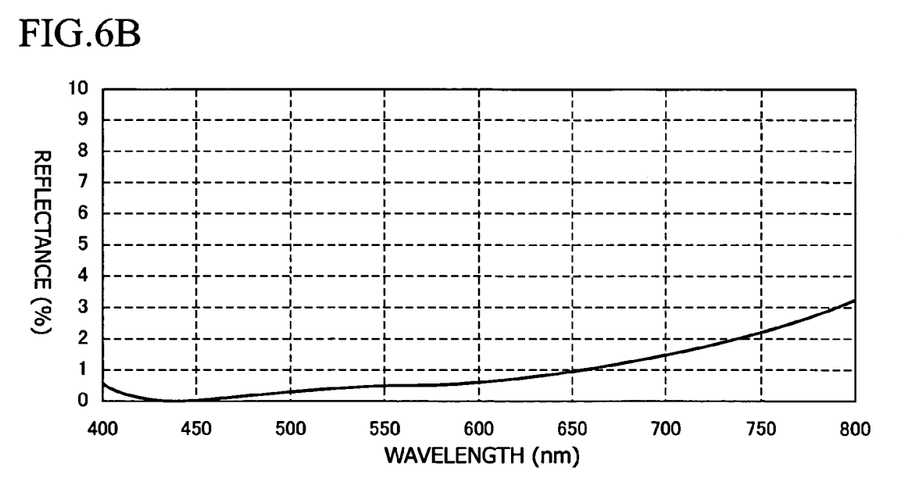
FIG. 6B is a graph showing the relationship between reflectance and wavelength of the absorption type multi-layer film ND filter according to to Example 1 of the present invention.

From the data shown in the graphs in FIGS. 6A and 6B, it was then ascertained that the transmittance in the visible spectral range (wavelength: 400 nm to 800 nm) was 32% to 40% and the ND filter had transmittance characteristics that were superior in flatness for wavelengths. Also, the reflectance in the visible spectral range was 4% or less, showing a good reflection preventive effect as well. Incidentally, it was also ascertained that these optical characteristics were likewise attained also in absorption type multi-layer film ND filters making use of the film substrates having the structures shown in FIGS. 2 and 3.

In addition, in respect of a change in the rate of film formation of the Ni—Ti thin films from the Ni target containing 7.5% by weight of Ti, the initial stage of use of the target was compared with the stage where the depth of target erosion (the region where the target decreased as a result of the sputtering) came to be 5 mm, to find that the change was as small as about 5%.

Thus, the absorption type multi-layer film ND filter according to Example 1, produced using the Ni target containing 7.5% by weight of Ti, was produced maintaining a constant rate of film formation, using the target continuously until it was used up, and hence also enjoyed a superior mass productivity.

Example 2

Under the same conditions as those in Example 1 except that the Ni type material target was changed for an Ni target containing 7.1% by weight of Ti (a target available from Sumitomo Metal Mining Co., Ltd.), the films (2) to (6) shown in Table 1 were formed in this order to produce the absorption type multi-layer film ND filter shown in FIG. 1.

Incidentally, this Ni target (available from Sumitomo Metal Mining Co., Ltd.) was also stably dischargeable on a non-magnetic-purpose cathode.

It was then ascertained that the transmittance of the absorption type multi-layer film ND filter according to Example 2 in the visible spectral range (wavelength: 400 nm to 800 nm) was 32% to 40% and the ND filter showed transmittance characteristics that were superior in flatness for wavelengths. Also, the reflectance in the visible spectral range was 4% or less, showing a good reflection preventive effect as well.

In respect of a change in the rate of film formation of the Ni type (Ni—Ti) thin films from the Ni target containing 7.1% by weight of Ti, the initial stage of use of the target was also compared with the stage where the depth of target erosion came to be 5 mm, to find that the change was as small as about 5%.

Thus, the absorption type multi-layer film ND filter according to Example 2, produced using the Ni target containing 7.1% by weight of Ti, was produced maintaining a constant rate of film formation, using the target continuously until it was used up, and hence also enjoyed a superior mass productivity.

Example 3

Under the same conditions as those in Example 1 except that the Ni type material target was changed for an Ni target containing 15% by weight of Ti (a target available from Sumitomo Metal Mining Co., Ltd.), the films (2) to (6) shown in Table 1 were formed in this order to produce the absorption type multi-layer film ND filter shown in FIG. 1.

Incidentally, this Ni target (available from Sumitomo Metal Mining Co., Ltd.) was also stably dischargeable on a non-magnetic-purpose cathode.

It was then ascertained that the transmittance of the absorption type multi-layer film ND filter according to Example 3 in the visible spectral range (wavelength: 400 nm to 800 nm) was 38% to 44% and the ND filter showed transmittance characteristics that were superior in flatness for wavelengths. Also, the reflectance in the visible spectral range was 4% or less, showing a good reflection preventive effect as well.

In respect of a change in the rate of film formation of the Ni type thin films from the Ni target containing 15% by weight of Ti, the initial stage of use of the target was also compared with the stage where the depth of target erosion came to be 5 mm, to find that the change was as small as about 5%.

Thus, the absorption type multi-layer film ND filter according to Example 3, produced using the Ni target containing 15% by weight of Ti, was produced maintaining a constant rate of film formation, using the target continuously until it was used up, and hence also enjoyed a superior mass productivity.

Example 4

Under the same conditions as those in Example 1 except that the Ni type material target was changed for an Ni target containing 6.5% by weight of Ti (a target available from Sumitomo Metal Mining Co., Ltd.), the films (2) to (6) shown in Table 1 were formed in this order to produce the absorption type multi-layer film ND filter shown in FIG. 1.

Incidentally, it was difficult for this Ni target (available from Sumitomo Metal Mining Co., Ltd.) to be stably discharged on a non-magnetic-purpose cathode, and the use of a ferromagnetic-purpose cathode enabled discharge and film formation.

However, as the Ni target was consumed, the discharge voltage and discharge current at the same applied power changed more greatly than those in Examples 1 to 3, and the rate of film formation also changed remarkably. Accordingly, where such an Ni target is used, it is necessary to measure the rate of film formation periodically.

Then, a control method in which the rate of film formation was measured one by one was adopted, where the films (2) to (6) shown in Table 1 were formed in this order to produce the absorption type multi-layer film ND filter shown in FIG. 1.

It was then ascertained that the transmittance of the absorption type multi-layer film ND filter according to Example 4 in the visible spectral range (wavelength: 400 nm to 800 nm) was 32% to 40% and the ND filter showed transmittance characteristics that were superior in flatness for wavelengths. Also, the reflectance in the visible spectral range was 4% or less, showing a good reflection preventive effect as well.

Example 5

An absorption type multi-layer film ND filter having a structure shown in Table 2 was produced in the same manner as in Example 1, in which filter an optical multi-layer member consisting of Ni metal layers each containing 7.5% by weight of Ti and $SiO_2$ layers both of which layers were alternately layered in the number of six layers in total was formed on a substrate via an adherent layer formed of $SiO_x$ (x is less than 2).

TABLE 2

| (2) | Adherent layer: | $SiO_x$ | 5 nm |
|---|---|---|---|
| (3) | Optical multi-layer member first layer: | Ni—Ti | 5 nm |
| (4) | Optical multi-layer member second layer: | $SiO_2$ | 40 nm |
| (5) | Optical multi-layer member third layer: | Ni—Ti | 4 nm |
| (6) | Optical multi-layer member fourth layer: | $SiO_2$ | 50 nm |
| (7) | Optical multi-layer member fifth layer: | Ni—Ti | 4 nm |
| (8) | Optical multi-layer member sixth layer: | $SiO_2$ | 50 nm |

The transmittance and reflectance of the absorption type multi-layer film ND filter thus produced were measured with an autographic spectrophotometer (U4100, an instrument manufactured by Hitachi Ltd.). The results of measurement are shown in FIGS. 7A and 7B.

Figure 7A:
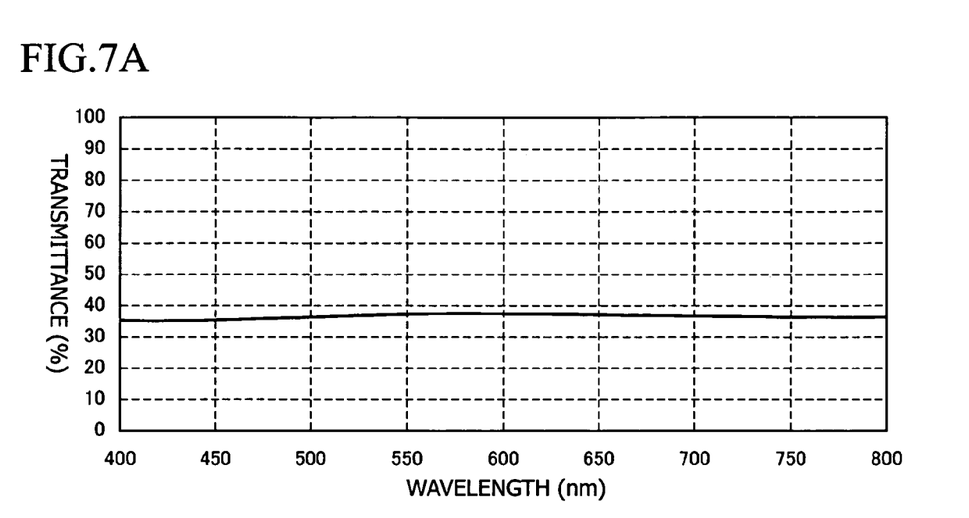
FIG. 7A is a graph showing the relationship between transmittance and wavelength of an absorption type multi-layer film ND filter according to Example 5 of the present invention.
Figure 7B:
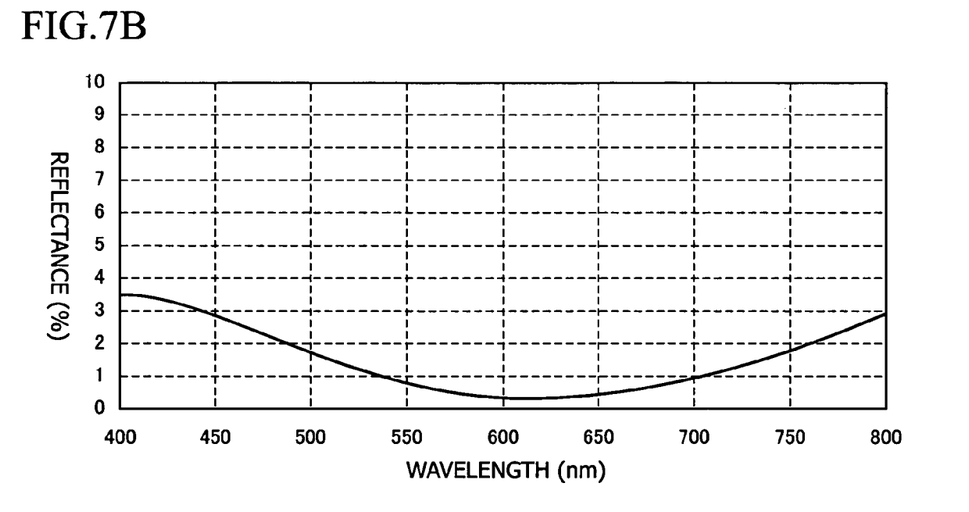
FIG. 7B is a graph showing the relationship between reflectance and wavelength of the absorption type multi-layer film ND filter according to to Example 5 of the present invention.

From the data shown in the graphs in FIGS. 7A and 7B, it was then ascertained that the transmittance in the visible spectral range (wavelength: 400 nm to 800 nm) was 34% to 37% and the ND filter had transmittance characteristics that were superior in flatness for wavelengths. Also, the reflectance in the visible spectral range was 4% or less, showing a good reflection preventive effect as well. Incidentally, it was also ascertained that these optical characteristics were likewise attained also in absorption type multi-layer film ND filters making use of the film substrates having the structures shown in FIGS. 2 and 3.

Example 6

Under the same conditions as those in Example 1 except that the Ni type material target was changed for an Ni target containing 7% by weight of V (a target available from Sumitomo Metal Mining Co., Ltd.), the films (2) to (6) shown in Table 1 were formed in this order to produce the absorption type multi-layer film ND filter shown in FIG. 1.

Incidentally, this Ni target (available from Sumitomo Metal Mining Co., Ltd.) was also stably dischargeable on a non-magnetic-purpose cathode.

It was then ascertained that the transmittance of the absorption type multi-layer film ND filter according to Example 6 in the visible spectral range (wavelength: 400 nm to 800 nm) was 32% to 40% and the ND filter showed transmittance characteristics that were superior in flatness for wavelengths. The reflectance in the visible spectral range was 4% or less, showing a good reflection preventive effect as well. Also, in comparison with the absorption type multi-layer film ND filter according to Example 1, making use of the Ni metal layers each containing 7.5% by weight of Ti, differences in transmittance and reflectance were held within plus-minus 0.5%, where substantially the same optical characteristics were attained.

In respect of a change in the rate of film formation of the Ni type (Ni—V) thin films from the Ni target containing 7% by weight of V, the initial stage of use of the target was also compared with the stage where the depth of target erosion came to be 5 mm, to find that the change was as small as about 3%.

Thus, the absorption type multi-layer film ND filter according to Example 6, produced using the Ni target containing 7% by weight of V, was produced maintaining a constant rate of film formation, using the target continuously until it was used up, and hence also enjoyed a superior mass productivity.

Example 7

Under the same conditions as those in Example 1 except that the Ni type material target was changed for an Ni target containing 19% by weight of W (a target available from Sumitomo Metal Mining Co., Ltd.), the films (2) to (6) shown in Table 1 were formed in this order to produce the absorption type multi-layer film ND filter shown in FIG. 1.

Incidentally, this Ni target (available from Sumitomo Metal Mining Co., Ltd.) was also stably dischargeable on a non-magnetic-purpose cathode.

It was then ascertained that the transmittance of the absorption type multi-layer film ND filter according to Example 7 in the visible spectral range (wavelength: 400 nm to 800 nm) was 32% to 40% and the ND filter showed transmittance characteristics that were superior in flatness for wavelengths. The reflectance in the visible spectral range was 4% or less, showing a good reflection preventive effect as well. Also, in comparison with the absorption type multi-layer film ND filter according to Example 1, making use of the Ni metal layers each containing 7.5% by weight of Ti, differences in transmittance and reflectance were held within plus-minus 0.5%, where substantially the same optical characteristics were attained.

In respect of a change in the rate of film formation of the Ni type (Ni—W) thin films from the Ni target containing 19% by weight of W, the initial stage of use of the target was also compared with the stage where the depth of target erosion came to be 5 mm, to find that the change was as small as about 6%.

Thus, the absorption type multi-layer film ND filter according to Example 7, produced using the Ni target containing 19% by weight of W, was produced maintaining a constant rate of film formation, using the target continuously until it was used up, and hence also enjoyed a superior mass productivity.

Example 8

Under the same conditions as those in Example 1 except that the Ni type material target was changed for an Ni target containing 4.5% by weight of Al and 0.5% by weight of Ti (a target available from Sumitomo Metal Mining Co., Ltd.), the films (2) to (6) shown in Table 1 were formed in this order to produce the absorption type multi-layer film ND filter shown in FIG. 1.

Incidentally, this Ni target (available from Sumitomo Metal Mining Co., Ltd.) was also stably dischargeable on a non-magnetic-purpose cathode.

It was then ascertained that the transmittance of the absorption type multi-layer film ND filter according to Example 8 in the visible spectral range (wavelength: 400 nm to 800 nm) was 32% to 40% and the ND filter showed transmittance characteristics that were superior in flatness for wavelengths. The reflectance in the visible spectral range was 4% or less, showing a good reflection preventive effect as well. Also, in comparison with the absorption type multi-layer film ND filter according to Example 1, making use of the Ni metal layers each containing 7.5% by weight of Ti, differences in transmittance and reflectance were held within plus-minus 0.5%, where substantially the same optical characteristics were attained.

In respect of a change in the rate of film formation of the Ni type (Ni—Al—Ti) thin films from the Ni target containing 4.5% by weight of Al and 0.5% by weight of Ti, the initial stage of use of the target was also compared with the stage where the depth of target erosion came to be 5 mm, to find that the change was as small as about 5%.

Thus, the absorption type multi-layer film ND filter according to Example 8, produced using the Ni target containing 4.5% by weight of Al and 0.5% by weight of Ti, was produced maintaining a constant rate of film formation, using the target continuously until it was used up, and hence also enjoyed a superior mass productivity.

Example 9

Under the same conditions as those in Example 1 except that the Ni type material target was changed for an Ni target containing 7.1% by weight of Ti (a target available from Sumitomo Metal Mining Co., Ltd.) and also the dielectric layers were changed for $Al_2O_3$ layers, films (3) to (6) shown in Table 3 below were formed in this order to produce an absorption type multi-layer film ND filter like the absorption type multi-layer film ND filter shown in FIG. 1 (provided that no adherent layer was present).

TABLE 3

| (3) | Optical multi-layer member first layer: | Ni—Ti | 7.9 nm |
|---|---|---|---|
| (4) | Optical multi-layer member second layer: | $Al_2O_3$ | 60 nm |
| (5) | Optical multi-layer member third layer: | Ni—Ti | 7.9 nm |
| (6) | Optical multi-layer member fourth layer: | $Al_2O_3$ | 60 nm |

Incidentally, this Ni target (available from Sumitomo Metal Mining Co., Ltd.) was also stably dischargeable on a non-magnetic-purpose cathode.

The transmittance and reflectance of this absorption type multi-layer film ND filter were measured with an autographic spectrophotometer (U4100, an instrument manufactured by Hitachi Ltd.). The results of measurement are shown in FIGS. 9A and 9B.

Figure 9A:
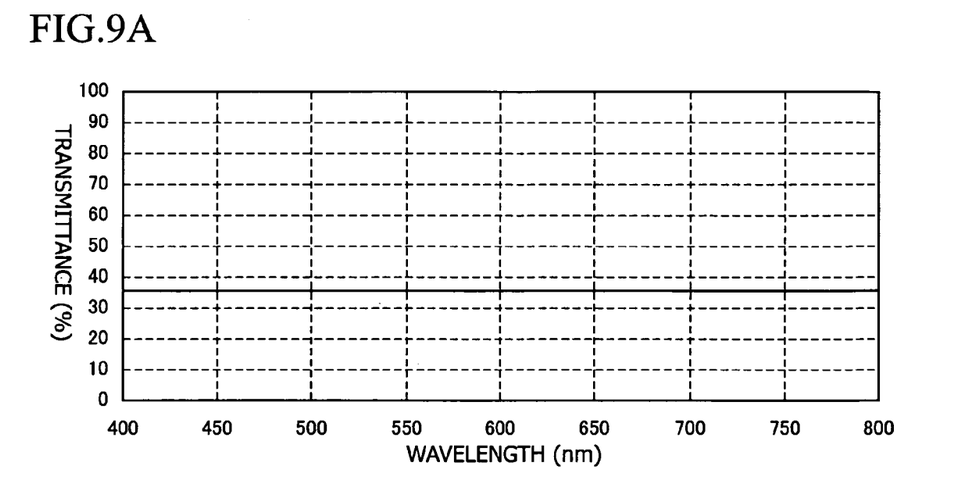
FIG. 9A is a graph showing the relationship between transmittance and wavelength of an absorption type multi-layer film ND filter according to Example 9 of the present invention.
Figure 9B:
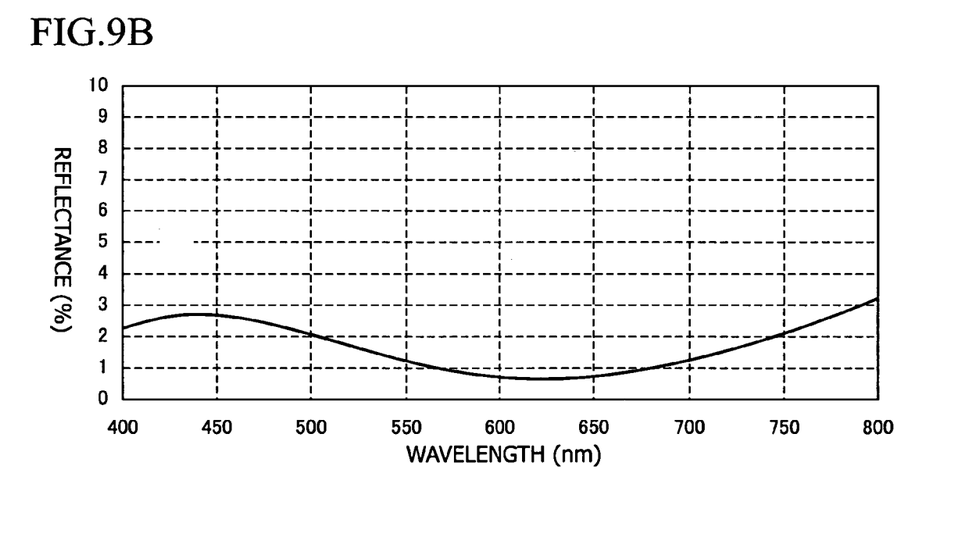
FIG. 9B is a graph showing the relationship between reflectance and wavelength of the absorption type multi-layer film ND filter according to to Example 9 of the present invention.

From the data shown in the graphs in FIGS. 9A and 9B, it was then ascertained that the transmittance of the absorption type multi-layer film ND filter according to Example 9 in the visible spectral range (wavelength: 400 nm to 800 nm) was 35% to 36% and the ND filter had transmittance characteristics that were superior in flatness for wavelengths. Also, the reflectance in the visible spectral range was 4% or less, showing a good reflection preventive effect as well.

In respect of a change in the rate of film formation of the Ni type (Ni—Ti) thin films from the Ni target containing 7.1% by weight of Ti, the initial stage of use of the target was also compared with the stage where the depth of target erosion came to be 5 mm, to find that the change was as small as about 5%.

Thus, the absorption type multi-layer film ND filter according to Example 9, produced using the Ni target containing 7.1% by weight of Ti, was produced maintaining a constant rate of film formation, using the target continuously until it was used up, and hence also enjoyed a superior mass productivity.

Example 10

Under the same conditions as those in Example 1 except that the Ni type material target was changed for an Ni target containing 7.1% by weight of Ti (a target available from Sumitomo Metal Mining Co., Ltd.) and also the dielectric layers were changed for $SiO_2$ and $Al_2O_3$ mixture layers, films (3) to (6) shown in Table 4 below were formed in this order to produce an absorption type multi-layer film ND filter like the absorption type multi-layer film ND filter shown in FIG. 1 (provided that no adherent layer was present).

TABLE 4

| (3) | Optical multi-layer member first layer: | Ni—Ti | 7.5 nm |
|---|---|---|---|
| (4) | Optical multi-layer member second layer: | $SiO_2 + Al_2O_3$ | 70 nm |
| (5) | Optical multi-layer member third layer: | Ni—Ti | 7.5 nm |
| (6) | Optical multi-layer member fourth layer: | $SiO_2 + Al_2O_3$ | 70 nm |

Incidentally, this Ni target (available from Sumitomo Metal Mining Co., Ltd.) was also stably dischargeable on a non-magnetic-purpose cathode.

The transmittance and reflectance of this absorption type multi-layer film ND filter were measured with an autographic spectrophotometer (U4100, an instrument manufactured by Hitachi Ltd.). The results of measurement are shown in FIGS. 10A and 10B.

Figure 10A:
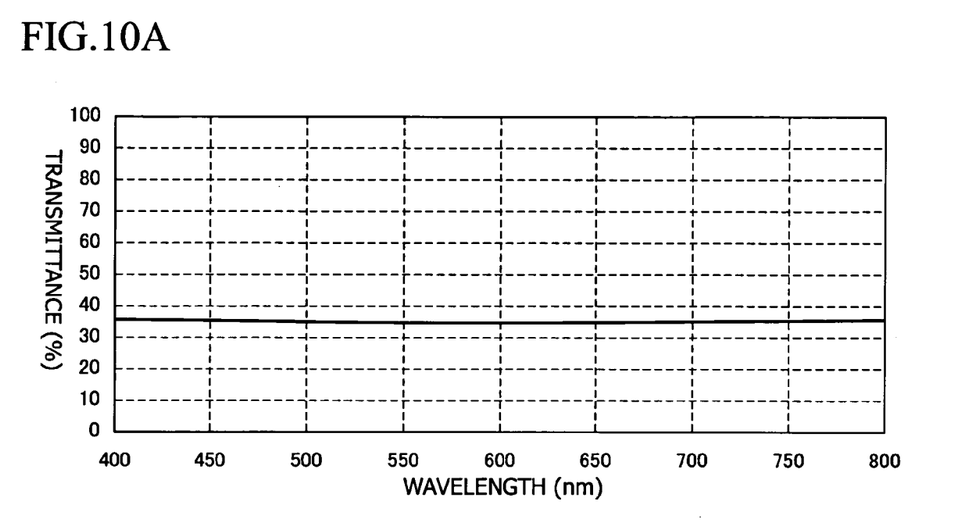
FIG. 10A is a graph showing the relationship between transmittance and wavelength of an absorption type multi-layer film ND filter according to Example 10 of the present invention.
Figure 10B:
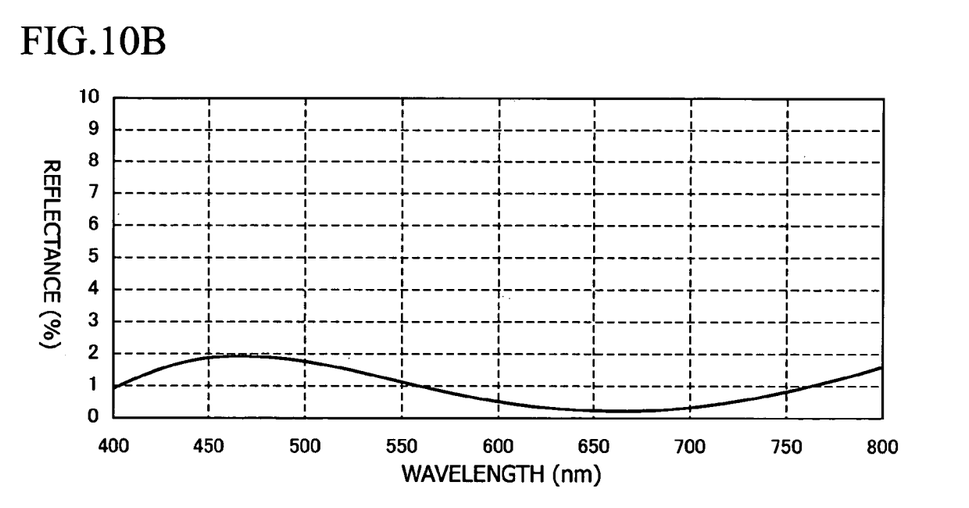
FIG. 10B is a graph showing the relationship between reflectance and wavelength of the absorption type multi-layer film ND filter according to to Example 10 of the present invention.

From the data shown in the graphs in FIGS. 10A and 10B, it was then ascertained that the transmittance of the absorption type multi-layer film ND filter according to Example 10 in the visible spectral range (wavelength: 400 nm to 800 nm) was 34% to 36% and the ND filter had transmittance characteristics that were superior in flatness for wavelengths. Also, the reflectance in the visible spectral range was 2% or less, showing a good reflection preventive effect as well.

In respect of a change in the rate of film formation of the Ni type (Ni—Ti) thin films from the Ni target containing 7.1% by weight of Ti, the initial stage of use of the target was also compared with the stage where the depth of target erosion came to be 5 mm, to find that the change was as small as about 5%.

Thus, the absorption type multi-layer film ND filter according to Example 10, produced using the Ni target containing 7.1% by weight of Ti, was produced maintaining a constant rate of film formation, using the target continuously until it was used up, and hence also enjoyed a superior mass productivity.

What is claimed is:

1. An absorption type multi-layer film ND filter which comprises:
   a substrate; and
   an optical multi-layer member consisting essentially of metal layers each composed chiefly of nickel (Ni) and dielectric layers each formed of any one of $SiO_2$, $Al_2O_3$ and a mixture of these; the layers being alternately layered on the substrate,
   wherein said metal layers each composed chiefly of Ni comprise an Ni alloy material formed by adding to Ni at least one element selected from Ti, Al, V, W, Ta and Si.

2. The absorption type multi-layer film ND filter according to claim 1, wherein the Ti element has been added in a proportion of from 5 to 15% by weight, the Al element has been added in a proportion of from 3 to 8% by weight, the V element has been added in a proportion of from 3 to 9% by weight, the W element has been added in a proportion of from 18 to 32% by weight, the Ta element has been added in a proportion of from 5 to 12% by weight and/or the Si element has been added in a proportion of from 2 to 6% by weight.

3. The absorption type multi-layer film ND filter according to claim 1, wherein said substrate comprises a resin sheet or a resin film.

4. The absorption type multi-layer film ND filter according to claim 3, wherein said resin sheet or resin film comprises a resin sheet or resin film single material selected from resin materials of polyethylene terephthalate (PET), polyether sulfone (PES), polyarylate (PAR), polycarbonate (PC), polyolefin (PO) and norbornene, or a composite material of i) the resin sheet or resin film single material selected from the above resin materials and ii) an acrylic organic film with which one side or both sides of any of these single materials is/are covered.

5. The absorption type multi-layer film ND filter according to claim 1, wherein said optical multi-layer member comprises four layers of a metal layer, a dielectric layer, a metal layer and a dielectric layer which have been layered in this order from the substrate side.

6. The absorption type multi-layer film ND filter according to claim 1, wherein said metal layers each have a layer thickness set within the range of from 2nm to 30nm.

7. The absorption type multi-layer film ND filter according to claim 1, wherein an adherent layer comprising Si, $SiO_x$ (where x is 2 or less), $SiN_x$ (where x is 1 or less), TiO, $TiO_x$ (where x is 2 or less) or $TiN_x$ (where x is 1 or less) is provided between said substrate and said optical multi-layer member.

8. The absorption type multi-layer film ND filter according to claim 1, which has a reflectance of 5% or less in the whole visible spectral range of from 400 nm to 800 nm and has variation of transmittance in a width within 10%.

9. The absorption type multi-layer film ND filter according to claim 1, wherein said metal layers each have a layer thickness set within the range of from 2 nm to 30 nm.

10. The absorption type multi-layer film ND filter according to claim 2, wherein said metal layers each have a layer thickness set within the range of from 2 nm to 30 nm.

11. The absorption type multi-layer film ND filter according to claim 5, wherein said metal layers each have a layer thickness set within the range of from 2 nm to 30 nm.

* * * * *